(12) United States Patent
Sung et al.

(10) Patent No.: US 12,536,916 B2
(45) Date of Patent: Jan. 27, 2026

(54) SYSTEM AND METHOD FOR CONTROLLING AERIAL VEHICLE

(71) Applicants: Hyundai Motor Company, Seoul (KR); Kia Corporation, Seoul (KR)

(72) Inventors: Chang Hyun Sung, Yongin-si (KR); Hye In Jung, Suwon-si (KR); Jun Young Lim, Seoul (KR); Hong Ju Lee, Anyang-si (KR); Hyun Jee Ryu, Gunpo-si (KR); Gun Hee Moon, Seoul (KR); Kyu Nam Kim, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 228 days.

(21) Appl. No.: 17/991,178

(22) Filed: Nov. 21, 2022

(65) Prior Publication Data
US 2023/0343227 A1    Oct. 26, 2023

(30) Foreign Application Priority Data
Apr. 21, 2022    (KR) .................. 10-2022-0049646

(51) Int. Cl.
*G08G 5/55* (2025.01)
*B64C 39/02* (2023.01)
*G08G 5/32* (2025.01)
*G08G 5/57* (2025.01)

(52) U.S. Cl.
CPC ............. *G08G 5/55* (2025.01); *B64C 39/024* (2013.01); *G08G 5/32* (2025.01); *G08G 5/57* (2025.01); *B64U 2201/10* (2023.01)

(58) Field of Classification Search
CPC .. G08G 5/0069; G08G 5/0034; G08G 5/0013; G08G 5/0021; G08G 5/0086; B64C 39/024; B64C 39/02; B64C 13/18; B64U 2201/10
See application file for complete search history.

(56) References Cited

U.S. PATENT DOCUMENTS

| 8,560,149 | B1* | 10/2013 | Ganguli ............... G05D 1/0083 701/15 |
| 10,247,573 | B1* | 4/2019 | Gavrilets ................ G01S 19/49 |
| 10,671,091 | B2 | 6/2020 | Tate |
| 10,831,192 | B1 | 11/2020 | Piasecki |
| 2016/0026189 | A1* | 1/2016 | Boada-Bauxell ......... G06T 7/73 348/144 |
| 2016/0240091 | A1* | 8/2016 | Thiele .................. G08G 5/0065 |
| 2017/0356757 | A1* | 12/2017 | Bourret ................ G01C 23/005 |
| 2018/0144646 | A1* | 5/2018 | Nitzan .................. G08G 5/727 |

(Continued)

FOREIGN PATENT DOCUMENTS

| KR | 102209503 B1 | 2/2021 |
| KR | 102289434 B1 | 8/2021 |

*Primary Examiner* — Abdalla A Khaled
(74) *Attorney, Agent, or Firm* — Fish & Richardson P.C.

(57) ABSTRACT

A system for controlling an aerial vehicle includes an autonomous control computer that detects a runway to estimate a state information error of the aerial vehicle, and a flight control computer that obtains state information of the aerial vehicle and transmits a determined flight mode of the aerial vehicle to the autonomous control computer when the flight mode of the aerial vehicle is determined as an autonomous flight mode based on the state information of the aerial vehicle.

12 Claims, 7 Drawing Sheets

(56) References Cited

U.S. PATENT DOCUMENTS

| | | | |
|---|---|---|---|
| 2018/0253110 A1* | 9/2018 | Tate | G05D 1/0607 |
| 2019/0096270 A1* | 3/2019 | Wang | G08G 5/55 |
| 2019/0323856 A1* | 10/2019 | Burlingame | G08G 5/21 |
| 2020/0027362 A1* | 1/2020 | Dame | G05D 1/0202 |
| 2020/0051442 A1* | 2/2020 | S | G08G 5/21 |
| 2020/0122820 A1* | 4/2020 | Dame | G05D 1/0088 |
| 2020/0202726 A1* | 6/2020 | Kestenbach | G05D 1/0287 |
| 2020/0273356 A1* | 8/2020 | Raynaud | G08G 5/26 |
| 2021/0020056 A1* | 1/2021 | Chenchu | G08G 5/21 |
| 2021/0158157 A1* | 5/2021 | Ganille | G06N 3/096 |
| 2022/0067369 A1* | 3/2022 | Billhartz | G06T 7/11 |
| 2022/0198703 A1* | 6/2022 | Evans | G06T 3/40 |
| 2022/0204180 A1* | 6/2022 | Sellmann | G08G 5/58 |
| 2023/0060551 A1* | 3/2023 | Khatwa | G08G 5/26 |
| 2023/0176566 A1* | 6/2023 | Woo | H04B 10/502 701/2 |

\* cited by examiner

SYSTEM AND METHOD FOR CONTROLLING AERIAL VEHICLE

CROSS-REFERENCE TO RELATED APPLICATION

This application claims the benefit of priority to Korean Patent Application No. 10-2022-0049646, filed in the Korean Intellectual Property Office on Apr. 21, 2022, the entire contents of which are incorporated herein by reference.

TECHNICAL FIELD

The present disclosure relates to a system and a method for controlling an aerial vehicle.

BACKGROUND

Aerial vehicles may include vehicles that have occupants including one or more pilots or one or more passengers on board and that are capable of autonomous or semi-autonomous flight (driving), and vehicles that do not carry occupants including one or more pilots or one or more passengers on board and are capable of autonomous flight (driving) by an external control or program. Accordingly, the aerial vehicle may be used in various fields, such as visiting and investigating an area where it is difficult for a person to directly fly and perform a mission, or perform meteorological observation, planetary exploration, aerial photography, and the like.

SUMMARY

The present disclosure has been made to solve the above-mentioned problems occurring in the prior art while advantages achieved by the prior art are maintained intact.

An aspect of the present disclosure provides a system and method for controlling an aerial vehicle capable of improving the reliability of autonomous flight.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a system for controlling an aerial vehicle includes an autonomous control computer that detects a runway to estimate a state information error of the aerial vehicle, and a flight control computer that obtains state information of the aerial vehicle and transmits a determined flight mode of the aerial vehicle to the autonomous control computer when the flight mode of the aerial vehicle is determined as an autonomous flight mode based on the state information of the aerial vehicle.

The flight control computer may obtain the state information of the aerial vehicle including a location, an altitude, a posture, an acceleration and an angular velocity of the aerial vehicle by using a navigation device including information obtained from a global positioning system and an inertial navigation system.

The system may further include a ground control station that transmits information on the runway and mission information to be performed by the aerial vehicle to the flight control computer.

The autonomous control computer may detect the runway based on at least one of a camera and a sensor when the flight mode determined as the autonomous flight mode is received.

The autonomous control computer may determine recognition accuracy of the runway when the runway is detected.

The autonomous control computer may estimate the state information error of the aerial vehicle based on the recognition accuracy of the runway.

The autonomous control computer may correct a heading value of the aerial vehicle based on the state information error of the aerial vehicle.

The flight control computer may receive a corrected heading value of the aerial vehicle from the autonomous control computer and update the state information of the aerial vehicle.

The flight control computer may calculate a flight control value of the aerial vehicle for performing a mission based on the updated state information of the vehicle and the mission information received from the ground control station, and may generate a flight route.

The flight control computer may calculate a flight control value of the aerial vehicle for performing a mission based on the mission information received from the ground control station and may generate a flight route when the flight mode of the aerial vehicle is not determined as the autonomous flight mode.

According to an aspect of the present disclosure, a method of controlling an aerial vehicle includes obtaining, by a flight control computer, state information of the aerial vehicle, transmitting a determined flight mode of the aerial vehicle to an autonomous control computer when the flight mode of the aerial vehicle is determined as an autonomous flight mode based on the state information of the aerial vehicle, detecting, by the autonomous control computer, a runway when the flight mode determined as the autonomous flight mode is received, and estimating a state information error of the aerial vehicle based on information on the detected runway.

The obtaining of the state information of the aerial vehicle may include obtaining the state information of the aerial vehicle including a location, an altitude, a posture, an acceleration and an angular velocity of the aerial vehicle by using a navigation device including a global positioning system and an inertial navigation system.

The method may further include transmitting, by a ground control station, information on the runway and mission information to be performed by the aerial vehicle to the flight control computer.

The detecting of the runway may include detecting the runway based on at least one of a camera and a sensor.

The method may further include determining recognition accuracy of the runway based on information on the detected runway.

The estimating of the state information error of the aerial vehicle may include estimating the state information error of the aerial vehicle based on the recognition accuracy of the runway.

The method may further include correcting, by the autonomous control computer, a heading value of the aerial vehicle based on the state information error of the aerial vehicle.

The method may further include receiving, by the flight control computer, a corrected heading value of the aerial vehicle from the autonomous control computer and updating the state information of the aerial vehicle.

The method may further include calculating, by the flight control computer, a flight control value of the aerial vehicle for performing a mission based on the updated state information of the vehicle and the mission information received from the ground control station, and generating a flight route.

The method may further include calculating, by the flight control computer, a flight control value of the aerial vehicle for performing a mission based on the mission information received from the ground control station and generating a flight route when the flight mode of the aerial vehicle is not determined as the autonomous flight mode.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
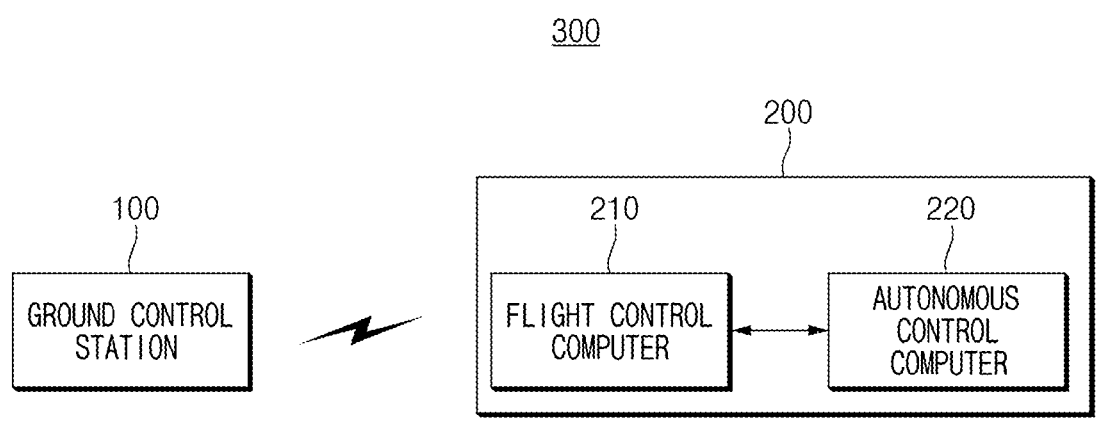
FIG. 1 is a diagram illustrating an example of a system for controlling an aerial vehicle.

FIG. 1 is a diagram illustrating an example of a system for controlling an aerial vehicle.

As shown in FIG. 1, a system 300 for controlling an aerial vehicle according to the present disclosure may include a ground control station 100 and an aerial vehicle 200.

The ground control station 100 may transmit information on a runway and mission information to be performed by the aerial vehicle to the aerial vehicle 200. In this case, the runway may include a straight road for the aerial vehicle to obtain propulsion for take-off and landing, and the runway information may include information on use of the runway and information on the shape of the runway.

The aerial vehicle 200 may include a flight control computer 210 and an autonomous control computer 220. The aerial vehicle 200 may include an unmanned motor vehicle that an occupant is not on board. The flight control computer 210 may estimate the state information of the aerial vehicle and determine the flight mode of the aerial vehicle based on the state information of the aerial vehicle. In addition, the determined flight mode may be transmitted to the autonomous control computer 220.

The autonomous control computer 220 may detect the runway to estimate the state information error of the aerial vehicle, correct the heading value of the aerial vehicle based on the state information error, and transmit the corrected heading value to the flight control computer 210.

Figure 2:
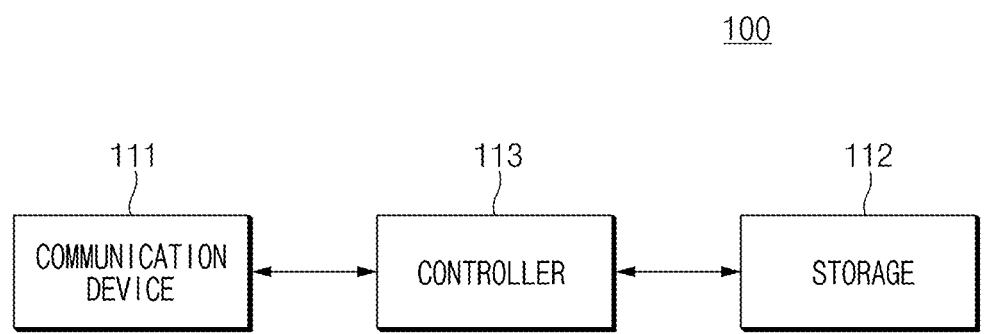
FIG. 2 is a diagram illustrating the configuration of an example of a ground control station.

FIG. 2 is a diagram illustrating an example of a ground control station.

As shown in FIG. 2, the ground control station 100 may include a communication device 111, storage 112, and a controller 113.

The communication device 111 may perform wireless communication with an aerial vehicle.

The storage 112 may store at least one algorithm for performing operations or executions of various commands to control wireless communication with an aerial vehicle.

The controller 113 may be implemented with various processing devices such as a microprocessor and the like in which a semiconductor chip capable of performing operations or executions of various commands is built-in, and may control operations of the ground control station 100. In some implementations, when the control operation of the ground control station 100 is not performed by the controller 113, the operation of the ground control station 100 may be replaced by the control of a ground pilot.

The controller 113 may transmit runway information and mission information to be performed by the aerial vehicle to the aerial vehicle 200. In addition, when the controller 113 receives flight operation information (motor operation information of the aerial vehicle, actuator operation information of the aerial vehicle, and the like) of the aerial vehicle from the aerial vehicle 200, the controller 113 may monitor the flight operation state based on the flight operation information and determine whether the aerial vehicle can fly autonomously. In addition, the controller 113 may transmit the result of determining whether autonomous flight is possible to the aerial vehicle.

Figure 3:
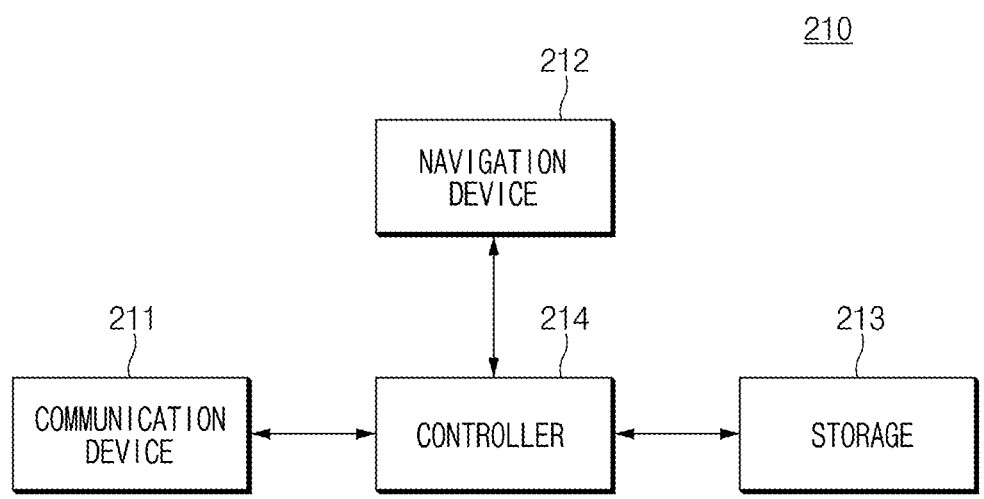
FIG. 3 is a diagram illustrating an example of a flight control computer.

FIG. 3 is a diagram illustrating an example of a flight control computer.

As shown in FIG. 3, the flight control computer 210 may include a communication device 211, a navigation device 212, storage 213 and a controller 214.

The communication device 211 may perform wireless communication with the ground control station 100.

The navigation device 212 may obtain the state information of the aerial vehicle. In some implementations, the navigation device 212 may include a global positioning system and an inertial navigation system. The navigation device 212 may obtain location information of the aerial vehicle, destination location information for performing a mission, and the like by using the global positioning system and the inertial navigation system. In this case, the location information of the aerial vehicle may include a latitude, a longitude, a speed, an altitude, and heading information. In addition, the navigation device 212 may include an attitude heading reference system (AHRS) for obtaining the attitude of the aerial vehicle. The AHRS may obtain the attitude information of the aerial vehicle including roll and pitch by acquiring the acceleration and angular velocity of the aerial vehicle.

The controller 214 may be implemented with various processing devices such as a microprocessor and the like in which a semiconductor chip capable of performing operations or executions of various commands is built-in, and may control operations of the flight control computer 210.

The controller 214 may determine the flight mode of the aerial vehicle based on the state information of the aerial vehicle obtained by using the navigation device 212 including the global positioning system and the inertial navigation system. In this case, the state information of the aerial vehicle may include location information and attitude information of the aerial vehicle.

In addition, the controller 214 may determine the flight mode based on the state information of the aerial vehicle. In some implementations, when it is determined that the flight mode is the autonomous flight mode, the controller 214 may transmit the flight mode determined as the autonomous flight mode to the autonomous control computer 220.

When receiving the corrected heading value of the aerial vehicle from the autonomous control computer 220, the controller 214 may update the state information of the aerial vehicle based on the received heading value of the aerial vehicle. In addition, the controller 214 may calculate the flight control value (the speed, altitude or heading value of the aerial vehicle) of the aerial vehicle for performing a mission based on the updated vehicle state information and the mission information received from the ground control station 100, and may generate a flight route for performing the mission.

In some implementations, when the flight mode of the aerial vehicle is not determined as the autonomous flight mode, the controller 214 may calculate the flight control value (the speed, altitude or heading value of the aerial vehicle) of the aerial vehicle for performing a mission based on the mission information received from the ground control station 100 and may generate a flight route.

The controller 214 may control the flight operation based on the calculated flight control value. In some implementations, the controller 214 may control the operation of the motor of the aerial vehicle, and may control the operation of the actuator. When the flight operation of the aerial vehicle is controlled, the controller 214 may transmit control operation information to the ground control station 100.

Figure 4:
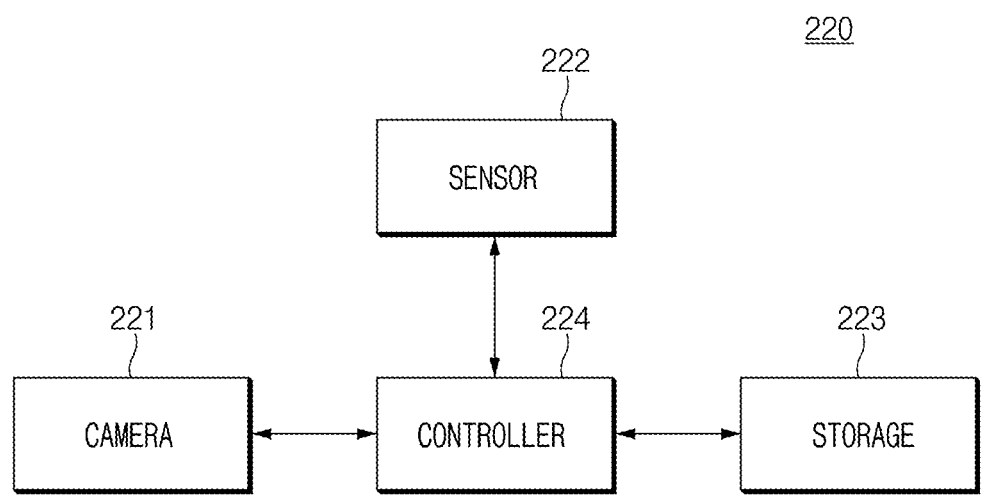
FIG. 4 is a diagram illustrating an example of an autonomous control computer.

FIG. 4 is a diagram illustrating an example of an autonomous control computer.

As shown in FIG. 4, the autonomous control computer 220 may include a camera 221, a sensor 222, storage 223, and a controller 224.

At least one camera 221 may be mounted on a lower portion of an aerial vehicle to obtain a shape image of a runway.

The sensor 222 may obtain scan information of the shape of the runway (line of the runway). To this end, the sensor may include a lidar and a radar. In addition, the sensor 222 may obtain scan information of obstacles on the runway.

The storage 223 may store at least one algorithm that performs operations or executions of various commands to control the operations of the autonomous control computer.

When the flight mode is received from the flight control computer 210, the controller 224 may control the camera 221 or the sensor 222 to detect the runway.

When the controller 224 detects the runway based on at least one of the camera 221 and the sensor 222, the controller 224 may determine the recognition accuracy of the runway based on the detected information. In some implementations, the controller 224 may compare the runway information received from the ground control station 100 with the runway detected by the camera 221 or sensor 222, and may determine the recognition accuracy of the runway based on the comparison result.

In some implementations, when the degree of coincidence between the runway information received from the ground control station 100 and the runway detected by the camera 221 or sensor 222 is equal to or greater than a preset value, the controller 224 may determine that the state information error of the aerial vehicle is insignificant, and may not estimate the error of the state information error of the aerial vehicle.

However, when the degree of coincidence between the runway information received from the ground control station 100 and the runway detected by the camera 221 or sensor 222 is less than the preset value, the controller 224 may estimate the state information error of the aerial vehicle.

When the error of the state information of the aerial vehicle is estimated, the controller 224 may correct the heading value of the aerial vehicle based on the state information error of the aerial vehicle, and may transmit the corrected heading value to the flight control computer 210.

Figure 5:
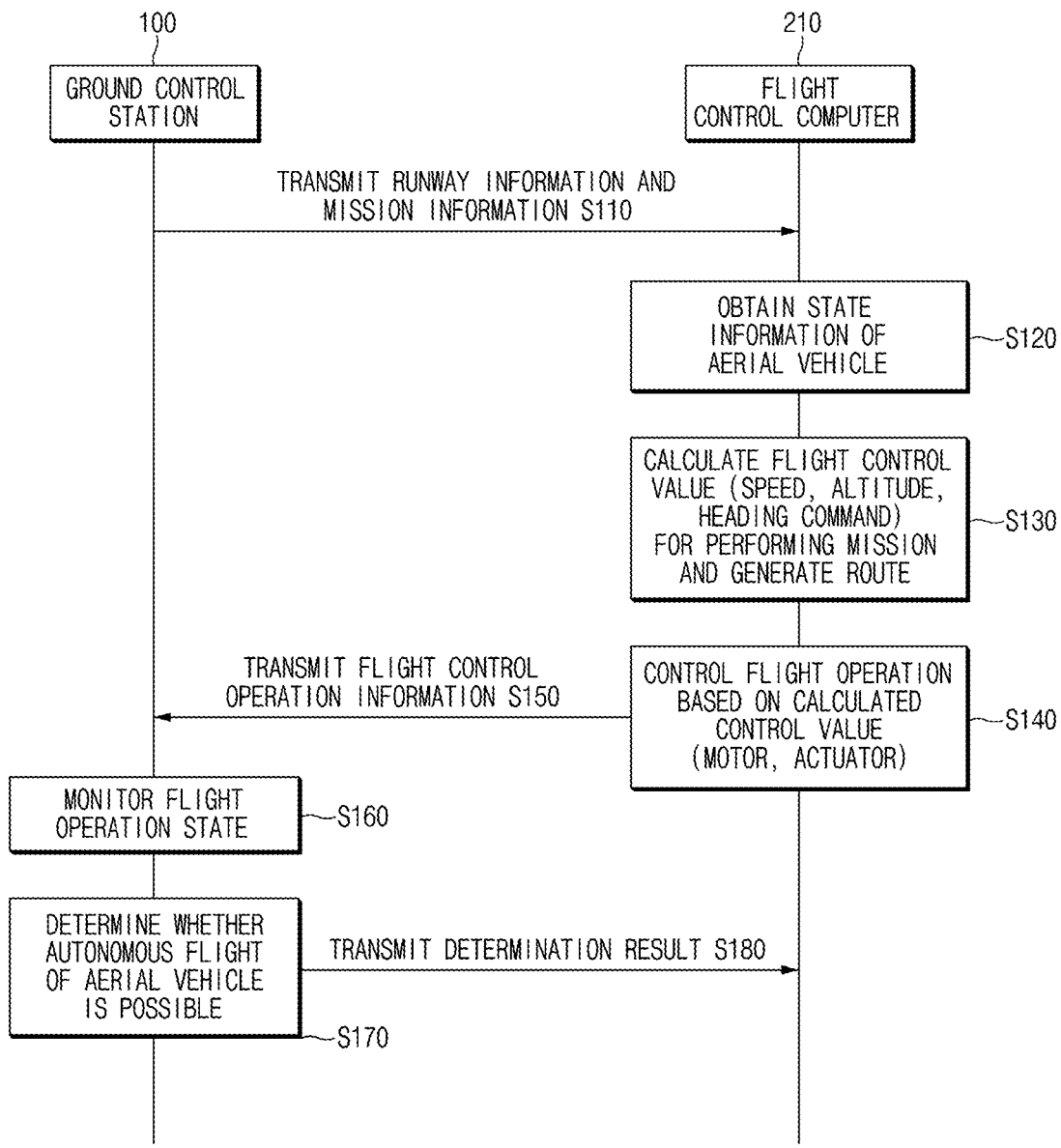
FIG. 5 is a view illustrating an example of a method of controlling an aerial vehicle.

FIG. 5 is a view illustrating an example of a method of controlling an aerial vehicle.

As shown in FIG. 5, in S110, the ground control station 100 may transmit the runway information and the mission information to be performed by the aerial vehicle to the flight control computer 210.

In S120, the flight control computer 210 may obtain the state information of the aerial vehicle by using the navigation device 212 including the global positioning system and the inertial navigation system. In this case, the state information of the aerial vehicle may include the location information and attitude information of the aerial vehicle.

In S130, when the flight mode is not determined as the autonomous flight mode based on the state information of the aerial vehicle, the flight control computer 210 may calculate the flight control value for performing the mission information received from the ground control station 100, and may generate the flight route for performing the mission. In this case, the flight control value may include the speed, altitude and heading value of the aerial vehicle.

In S140, the flight control computer 210 may control the flight operation based on the calculated flight control value. In some implementations, in S140, the flight control computer 210 may control the operation of the motor of the aerial vehicle, and may control the operation of the actuator.

In S150, the flight control computer 210 may transmit the control operation information to the ground control station 100 when the flight operation of the aerial vehicle is controlled.

When the ground control station 100 receives the flight operation information (motor operation information of the aerial vehicle, actuator operation information of the aerial vehicle, and the like) for controlling the aerial vehicle from the flight control computer 210, the ground control station 100 may monitor the flight operation state based on the flight operation information in S160, and may determine whether the aerial vehicle can flay autonomously in S170. In addition, the ground control station 100 may transmit the result of determining whether autonomous flight is possible to the aerial vehicle in S180.

Figure 6:
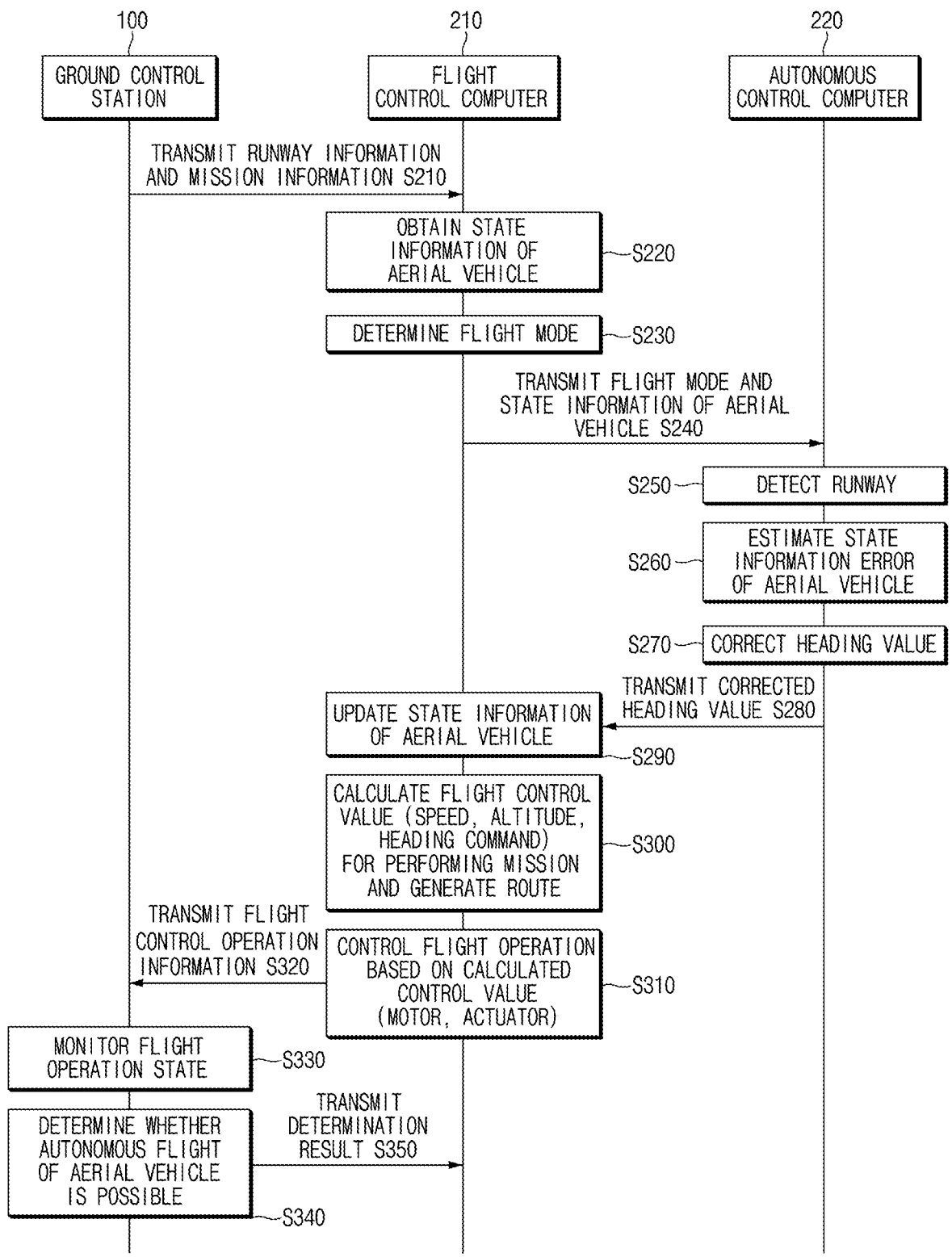
FIG. 6 is a view illustrating another example of a method of controlling an aerial vehicle.

FIG. 6 is a view illustrating an example of a method of controlling an aerial vehicle.

As shown in FIG. 6, in S210, the ground control station 100 may transmit the runway information and the mission information to be performed by the aerial vehicle to the flight control computer 210.

In S220, the flight control computer 210 may obtain the state information of the aerial vehicle by using the navigation device 212 including the global positioning system and the inertial navigation system. In this case, the state information of the aerial vehicle may include the location information and attitude information of the aerial vehicle.

In S230, the flight control computer 210 may determine the flight mode of the aerial vehicle based on the state information of the aerial vehicle.

When the flight mode is determined as the autonomous flight mode, in S240, the flight control computer 210 may transmit the state information of the aerial vehicle and the flight mode information determined as the autonomous flight mode to the autonomous control computer 220.

In S250, the autonomous control computer 220 may control the camera 221 or the sensor 222 to detect the runway when the flight mode is received from the flight control computer 210.

When the camera 221 and the sensor 222 detect the runway, the autonomous control computer 220 may determine the recognition accuracy of the runway based on the detected information. In some implementations, the autonomous control computer 220 may compare the runway information received from the ground control station 100 with the runway detected by the camera 221 or sensor 222, and may determine the recognition accuracy of the runway based on the comparison result.

In some implementations, when the degree of coincidence between the runway information received from the ground control station 100 and the runway detected by the camera 221 or sensor 222 is equal to or greater than a preset value, autonomous control computer 220 may determine that the state information error of the aerial vehicle is insignificant, and may not estimate the error of the state information error of the aerial vehicle.

However, when the degree of coincidence between the runway information received from the ground control station 100 and the runway detected by the camera 221 or sensor 222 is less than the preset value, in S260, the autonomous control computer 220 may estimate the state information error of the aerial vehicle.

When the error of the state information of the aerial vehicle is estimated, in S270, the autonomous control computer 220 may correct the heading value of the aerial vehicle based on the state information error of the aerial vehicle. In addition, in S280, the autonomous control computer 220 may transmit the corrected heading value to the flight control computer 210.

In S290, the flight control computer 210 may receive the corrected heading value of the aerial vehicle from the autonomous control computer 220, and update the state information of the aerial vehicle based on the received heading value of the aerial vehicle.

In addition, in S300, the flight control computer 210 may calculate the flight control value (the speed, altitude or heading value of the aerial vehicle) of the aerial vehicle for performing a mission based on the updated vehicle state information and the mission information received from the ground control station 100, and may generate a flight route for performing the mission.

In S310, the flight control computer 210 may control the flight operation based on the calculated flight control value. In some implementations, in S310, the flight control computer 210 may control the operation of the motor of the aerial vehicle, and may control the operation of the actuator.

In S320, the flight control computer 210 may transmit the control operation information to the ground control station 100 when the flight operation of the aerial vehicle is controlled.

When the ground control station 100 receives the flight operation information (motor operation information of the aerial vehicle, actuator operation information of the aerial vehicle, and the like) for controlling the aerial vehicle from the flight control computer 210, the ground control station 100 may monitor the flight operation state based on the flight operation information in S330, and may determine whether the aerial vehicle can flay autonomously in S340.

Although the flight control computer 210 determines the flight mode as the autonomous flight in S230, the flight control computer 210 may update the vehicle state information based on the information detected by the autonomous control computer 220. Because the ground control station 100 receives the flight control operation information controlled based on the updated vehicle state information and determines whether the vehicle can autonomously fly again, it is possible to improve the reliability of the autonomous flight of the aerial vehicle.

In addition, in S350, the ground control station 100 may transmit the result of determining whether autonomous flight is possible to the aerial vehicle.

Figure 7:
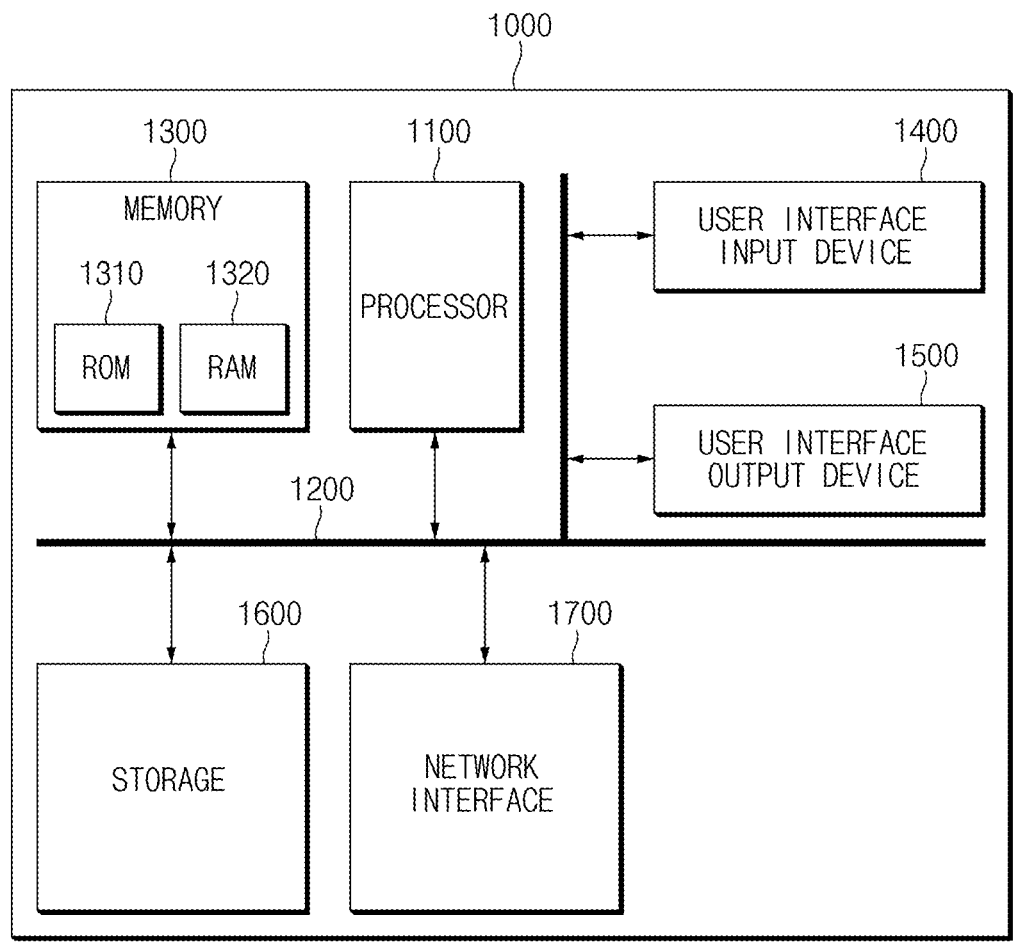
FIG. 7 is a block diagram illustrating an example of a computing system for executing a method.

FIG. 7 is a block diagram illustrating an example of a computing system for executing a method.

Referring to FIG. 7, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the implementations of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The aerial vehicle control system and method can improve the reliability of autonomous flight.

What is claimed is:

1. A system for controlling an aerial vehicle, the system comprising:
   an autonomous control computer configured to detect a runway to estimate a state information error of the aerial vehicle; and
   a flight control computer configured to:
   obtain state information of the aerial vehicle,
   transmit, based on a determined flight mode of the aerial vehicle being an autonomous flight mode according to the state information of the aerial vehicle, the determined flight mode of the aerial vehicle to the autonomous control computer,
   wherein the autonomous control computer is configured to:
   determine, based on the runway being detected, recognition accuracy of the runway according to a degree of alignment between first runway information obtained from a camera or a sensor and second runway information received from a ground control station, and
   estimate, based on the degree of alignment being less than a preset value, the state information error of the aerial vehicle to thereby update the state information of the aerial vehicle, wherein the autonomous control computer is configured to correct a heading value of the aerial vehicle based on the state information error of the aerial vehicle, wherein the flight control computer is configured to (i) receive the corrected heading value of the aerial vehicle from the autonomous control computer and (ii) update the state information of the aerial vehicle based on the received corrected heading value, wherein the flight control computer is configured to (i) calculate a flight control value of the aerial vehicle for performing a mission based on updated state information of the aerial vehicle and mission information that is to be performed by the aerial vehicle and that is received from ground control station and (ii) generate a flight route for performing the mission, and wherein the flight control computer is further configured to control a flight operation of the aerial vehicle based on the calculated flight control value, including controlling operation of a motor or an actuator of the aerial vehicle.

2. The system of claim 1, wherein the flight control computer is configured to obtain the state information of the aerial vehicle including a location, an altitude, a posture, an acceleration, and an angular velocity of the aerial vehicle by using a navigation device configured to obtain information from a global positioning system and an inertial navigation system.

3. The system of claim 1, further comprising:
a ground control station configured to transmit, to the flight control computer, information regarding the runway and mission information to be performed by the aerial vehicle.

4. The system of claim 1, wherein the autonomous control computer is configured to, based on the flight mode determined as the autonomous flight mode being received, detect the runway based on at least one of the camera or the sensor.

5. The system of claim 1, wherein the flight control computer is configured to, based on the flight mode of the aerial vehicle not being determined as the autonomous flight mode, (i) calculate a flight control value of the aerial vehicle for performing a mission based on mission information that is to be performed by the aerial vehicle and that is received from ground control station and (ii) generate a flight route for performing the mission.

6. A method of controlling an aerial vehicle, the method comprising:
obtaining, by a flight control computer, state information of the aerial vehicle;
transmitting, based on a determined flight mode of the aerial vehicle being an autonomous flight mode according to the state information of the aerial vehicle, the determined flight mode of the aerial vehicle to an autonomous control computer;
detecting, by the autonomous control computer, a runway based on the flight mode determined as the autonomous flight mode being received by the autonomous control computer;
estimating a state information error of the aerial vehicle based on information regarding the detected runway; and
determining, based on the runway being detected, recognition accuracy of the runway according to a degree of alignment between first runway information obtained from a camera or a sensor and second runway information received from a ground control station, by the autonomous control computer, wherein estimating the state information error of the aerial vehicle comprises estimating, based on the degree of alignment being less than a preset value, the state information error of the aerial vehicle to thereby update the state information of the aerial vehicle, wherein the method further comprises:
correcting, by the autonomous control computer, a heading value of the aerial vehicle based on the state information error of the aerial vehicle,
receiving, by the flight control computer, the corrected heading value of the aerial vehicle from the autonomous control computer,
updating the state information of the aerial vehicle based on the received corrected heading value,
calculating, by the flight control computer, a flight control value of the aerial vehicle for performing a mission based on the updated state information of the aerial vehicle and mission information that is to be performed by the aerial vehicle and that is received from a ground control station,
generating, by the flight control computer, a flight route for performing the mission, and
controlling, by the flight control computer, a flight operation of the aerial vehicle based on the calculated flight control value, including controlling operation of a motor or an actuator of the aerial vehicle.

7. The method of claim 6, wherein obtaining the state information of the aerial vehicle includes:
obtaining the state information of the aerial vehicle including a location, an altitude, a posture, an acceleration, and an angular velocity of the aerial vehicle by using a navigation device including a global positioning system and an inertial navigation system.

8. The method of claim 6, further comprising:
transmitting, by a ground control station, information regarding the runway and mission information to be performed by the aerial vehicle to the flight control computer.

9. The method of claim 6, wherein detecting the runway includes:
detecting the runway based on at least one of the camera or the sensor.

10. The method of claim 6, further comprising:
based on the flight mode of the aerial vehicle not being determined as the autonomous flight mode:
calculating, by the flight control computer, a flight control value of the aerial vehicle for performing a mission based on mission information that is to be performed by the aerial vehicle and that is received from ground control station; and
generating a flight route for performing the mission.

11. The system of claim 1, wherein the state information of the aerial vehicle includes position information and attitude information of the aerial vehicle.

12. The method of claim 6, wherein the state information of the aerial vehicle includes position information and attitude information of the aerial vehicle.

* * * * *